United States Patent
Ngai et al.

(10) Patent No.: US 8,090,395 B2
(45) Date of Patent: Jan. 3, 2012

(54) SCANNING CHANNELS WHILE A DEVICE IS OUT OF SERVICE

(75) Inventors: Francis M. Ngai, Louisville, CO (US); Parag Mohan Kanade, San Diego, CA (US); Alex Kuang-Hsuan Tu, San Diego, CA (US); Virat Deepak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 12/403,117

(22) Filed: Mar. 12, 2009

(65) Prior Publication Data

US 2010/0234021 A1 Sep. 16, 2010

(51) Int. Cl.
*H04W 4/00* (2009.01)
*H04W 72/06* (2009.01)
(52) U.S. Cl. ............... 455/513; 455/433; 455/432.1; 455/574
(58) Field of Classification Search ............... 455/422.1, 455/432.1, 433, 435.3, 434, 456.1, 457, 510, 455/512, 513
See application file for complete search history.

(56) References Cited

U.S. PATENT DOCUMENTS

| | | | |
|---|---|---|---|
| 5,896,572 A | 4/1999 | Scotton | |
| 6,169,899 B1* | 1/2001 | Havinis et al. | 455/433 |
| 6,259,917 B1 | 7/2001 | Elzein | |
| 6,564,055 B1* | 5/2003 | Hronek | 455/433 |
| 7,532,886 B2* | 5/2009 | Aoki et al. | 455/435.3 |
| 2002/0168976 A1* | 11/2002 | Krishnan | 455/432 |
| 2006/0286977 A1* | 12/2006 | Khandelwal et al. | 455/432.1 |
| 2007/0082688 A1 | 4/2007 | Tu et al. | |
| 2007/0268877 A1 | 11/2007 | Buckley et al. | |
| 2008/0170525 A1 | 7/2008 | Geiger | |
| 2011/0117911 A1* | 5/2011 | Narang et al. | 455/434 |

OTHER PUBLICATIONS

International Search Report and Written Opinion—PCT/US2010/027241, International Search Authority—European Patent Office, Sep. 21, 2010.

* cited by examiner

*Primary Examiner* — Don Le
(74) *Attorney, Agent, or Firm* — Darren M. Simon

(57) ABSTRACT

A channel scanning order is dynamically created, modified, selectively ignored, or combinations thereof based on historical data, motion information, context information, alert message systems, network reselection, or combinations thereof. If a less preferred network has served a mobile device longer than a threshold amount of time, acquisition of the less preferred network is attempted before attempting acquisition of a more preferred network.

22 Claims, 12 Drawing Sheets

SCANNING CHANNELS WHILE A DEVICE IS OUT OF SERVICE

BACKGROUND

I. Field

The following description relates generally to wireless communications and more particularly to channel scanning that mitigates network acquisition time and increases system selection performance.

II. Background

Wireless communication systems are widely deployed to provide various types of communication and to communicate information regardless of where a user is located (e.g., inside or outside a structure) and whether a user is stationary or moving (e.g., in a vehicle, walking). For example, voice, data, video and so forth can be provided through wireless communication systems. A typical wireless communication system, or network, can provide multiple users access to one or more shared resources. A system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Wireless network market deployments generally include multiple carriers (or networks) and roaming agreements between carriers, referred to as roaming partners. Each carrier usually desires that the mobile device, which has subscribed to that carrier's service (referred to as a home network) perform functions or calls (e.g., data transfer, communication, and so forth) on the home network as long as possible. Only when the mobile device is moving out of the coverage of the home network, or for some other reason cannot obtain home network coverage, should the mobile device transfer to a roaming partner's coverage.

There are at least two motivations for utilizing the home network as long as possible. First, the roaming network might charge the user an additional fee for usage of the roaming partner's coverage, which is referred to as revenue consciousness. Second, the home network can lose revenue because the home network is not being utilized for the particular function or call. Although there are motivations for desiring to mitigate utilization of a roaming service, in some areas (e.g., different geographical areas, such as different states or countries) only the roaming service might be available. For example, on the West Coast of the United States, a first carrier or operator is available and on the East Coast of the United States, the first carrier is not available, but a second carrier is available. Thus, if a user travels from the West Coast to the East Coast, the user would not have service from the first carrier. Further, if roaming service were not available, the user would have no service on the East Coast (e.g., cannot gain access to the second carrier).

In order to utilize a home network as long as possible, conventional services utilize a list of preferred systems (e.g., home system and/or roaming system), which is based on static information. The list would advise a device to scan in a fixed (static) order from a first listed channel and continue through the list until the last channel is scanned and then repeat with the first listed channel (if network acquisition has not occurred). Thus, the static list does not take into account roaming networks or other parameters, but remains static, which can result in a device continuously scanning unavailable channels.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with scanning channels when a device is out of service. Historical analysis over an extend period can be utilized to construct a network log that includes the history of previously utilized networks. Based on this network log, a scanning order of channels associated with the previously utilized networks can be constructed. The scanning order is dynamically modified to obtain network service quicker. For example, channels of a most recently used network (e.g., roaming network) can be scanned before scanning channels of networks (e.g., home network) that have not been accessed recently and/or that have not been utilized as often as other networks. According to some aspects, both location and historical analysis can be combined to determine a preferred channel scanning order (e.g., smart lists) that can dynamically change as a function of location and history. In accordance with some aspects, motion can be utilized to determine a channel scanning order. In accordance with further aspects, the channel scanning order can be dynamically modified and/or deliberately ignored as a function of a mobile alert system (e.g., emergency conditions).

According to an aspect is a method performed by a mobile device for scanning channels in a communications environment. The method includes determining a time in service for a mobile device as a function of historical acquisition times and historical network depart times. The method also includes developing a network log based on the time in service determination and creating a channel ranking order based, in part, on the time in service determination. The channel ranking order provides a sequence for scanning channels in a communications environment.

Another aspect relates to a wireless communications apparatus that includes a memory and a processor. The memory retains instructions related to calculating a time in service for each network acquired during a target time period, constructing a network log based on the time in service determination, and creating a channel scan order that provides a sequence to scan channels in a communication environment. The time in service is calculated as a function of historical acquisition times and historical network depart times. The processor is coupled to the memory and is configured to execute the instructions retained in the memory.

A further aspect relates to a wireless communications apparatus that scans channels in a dynamically determined order. The wireless communications apparatus includes means for analyzing a time in service for the apparatus as a function of historical acquisition times and historical network depart times and means for generating a network log based on the time in service determination. The network log includes information related to whether each network is a home network or a roaming network. The wireless communications apparatus also includes means for establishing a channel scan order based, in part, on the time in service determination. The channel scan order provides an arrangement for scanning channels in a communication environment.

Yet another aspect relates to a computer program product, comprising a computer-readable medium. The computer-readable medium includes a first set of codes for causing a computer to calculate a time in service for a mobile device as a function of historical acquisition times and historical network depart times. Also included in the computer-readable medium is a second set of codes for causing the computer to generate a network log based on the time in service determination and a third set of codes for causing the computer to establish a channel ranking order based, in part, on the time in service determination. The channel ranking order provides a sequence for scanning channels in a communications environment.

Still another aspect relates to at least one processor configured to scan network channels in a preferred order. The processor includes a first module for ascertaining a time in service for a mobile device as a function of historical acquisition times and historical network depart times. Also included is a second module for developing a network log based on the time in service determination. The processor also includes a third module for generating a channel ranking order based, in part, on the time in service determination. The channel ranking order provides a sequence for scanning channels in a communications environment. Also included in processor is a fourth module for scanning for availability of preferred networks during a network reselection attempt if a less preferred network is currently serving the mobile device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
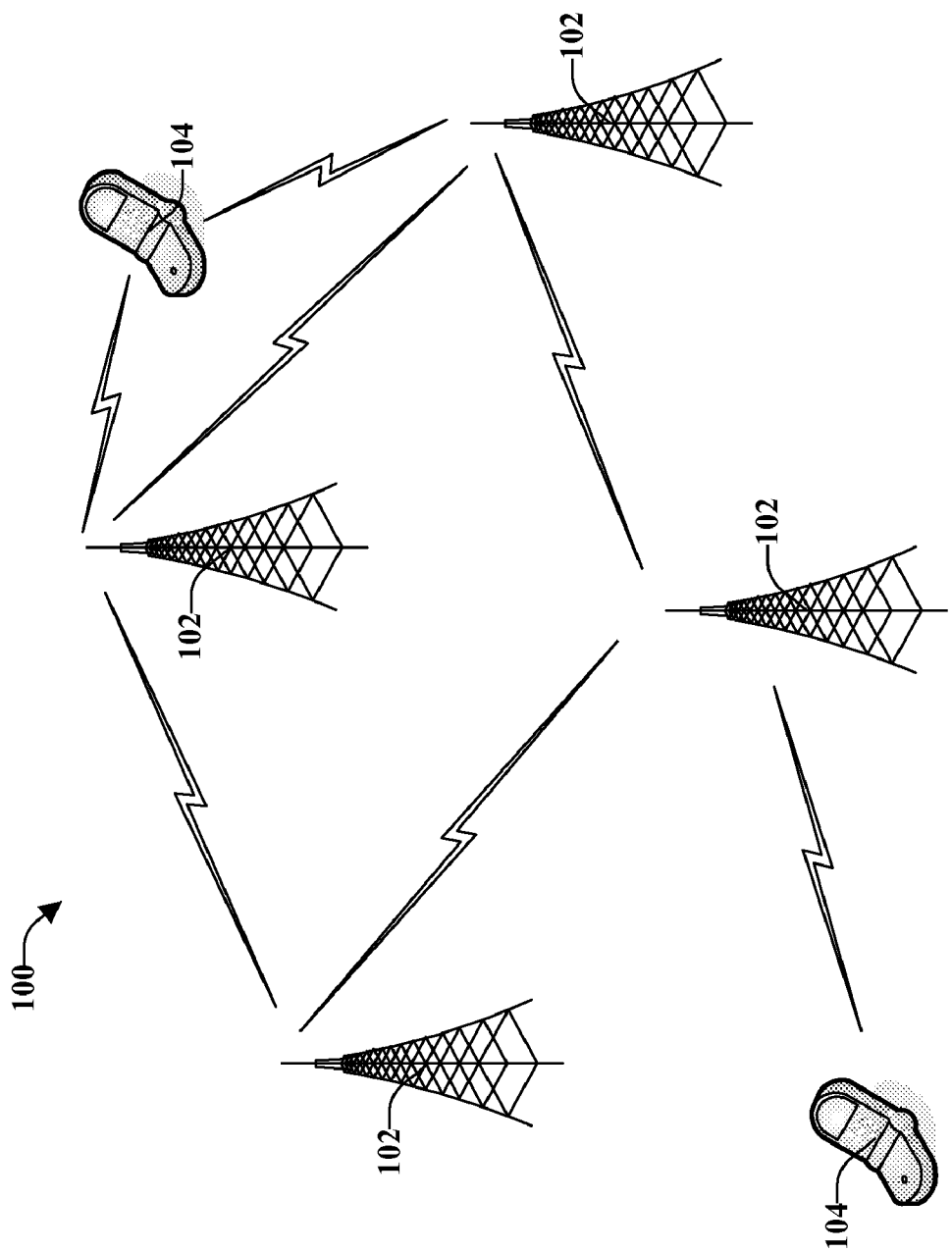
FIG. 1 illustrates a wireless communication system in accordance with various aspects presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

In a communication network, scanning for channels that are not currently available (sometimes referred to as "dead channels") consumes power and increases time for acquiring a valid (e.g., currently available) network. If a preferred network (e.g., home network) and one or more less preferred networks (e.g., roaming networks) are available, it can be beneficial to acquire the preferred network as soon as possible while mitigating the scanning of channels associated with the less preferred network(s). Acquiring the less preferred network can be undesirable not only from a cost or revenue perspective, but also from a battery performance aspect. For example, an operator (e.g., service provider, network) and/or a user might incur higher usage charges on the less preferred (e.g., roaming) network. Further, the device attempting to gain access to the roaming network has to send access probes in order to register with the new (e.g., roaming) network. Sending these access probes consumes battery power as well as other system resources (e.g., wireless bandwidth, overhead, and so forth). However, there can be situations where obtaining the less preferred network is more desirable, such as when the device is out of range of the more preferred (home) network.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Referring now to FIG. 1, illustrated is a wireless communication system 100 in accordance with various aspects presented herein. System 100 can comprise one or more base stations 102 in one or more sectors that receive, transmit, repeat, and so forth, wireless communication signals to each other and/or to one or more mobile devices 104. Each base station 102 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device 104 can comprise one or more transmitter chains and receiver chains, which can be utilized for a multiple input multiple output (MIMO) system. Each transmitter and receiver chain can comprise a plurality of components associated with signal transmission and reception (e.g., processors, modulators, multiplexers, demodulators, demultiplexers, antennas, and so on), as will be appreciated by one skilled in the art. One or more base stations 102 can be associated with a home network or with a roaming network, depending on the communication environment.

Each mobile device 104 can be configured to maintain a history of the networks (e.g., base stations 102) it has acquired as well as other parameters (e.g., time of acquisition, time of loss of network, time of departing a network, time in service, network preference, frequency, channel of network, technology utilized by the network (e.g., GSM, 1x, wireless LAN, LTE, etc.), system id and network id, and so on). Based on this history, a channel scanning order (e.g., list, table, chart, and so forth) can be established such that more preferred networks (e.g., home network) are scanned first and other networks' channels (e.g., roaming networks) are scanned only if the preferred networks cannot be accessed. In accordance with some aspects, the scanning order is changed automatically so that less preferred networks (e.g., roaming network) are scanned first, which would be the situation if connectivity with the home network is not available (e.g., device is out of range of home network, and so forth). In this situation, channels related to the roaming networks are scanned before scanning the preferred networks (e.g., home network) in order to more quickly establish network connectivity. These various aspects are discussed in further detail below.

Figure 2:
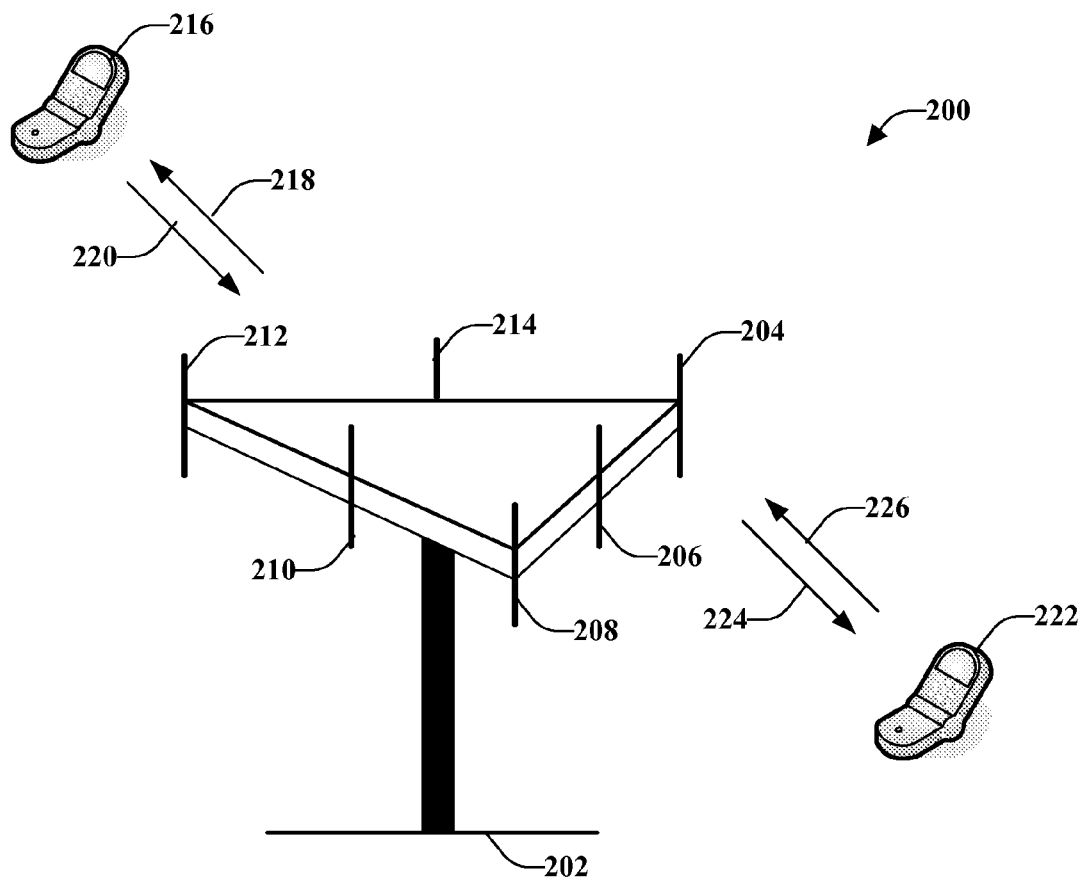
FIG. 2 illustrates a multiple access wireless communication system according to one or more aspects.

Referring now to FIG. 2, a multiple access wireless communication system 200 according to one or more aspects is illustrated. A wireless communication system 200 can include one or more base stations in contact with one or more user devices. Each base station provides coverage for a plurality of sectors. A three-sector base station 202 is illustrated that includes multiple antenna groups, one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 218 and receive information from mobile device 216 over reverse link 220. Forward link (or downlink) refers to the communication link from the base stations to mobile devices, and the reverse link (or uplink) refers to the communication link from mobile devices to the base stations. Mobile device 222 is in communication with antennas 204 and 206, where antennas 204 and 206 transmit information to mobile device 222 over forward link 224 and receive information from mobile device 222 over reverse link 226. In a FDD system, for example, communication links 218, 220, 224, and 226 might utilize different frequencies for communication. For example, forward link 218 might use a different frequency than the frequency utilized by reverse link 220.

Each group of antennas and/or the area in which they are designated to communicate may be referred to as a sector of base station 202. In one or more aspects, antenna groups each are designed to communicate to mobile devices in a sector or the areas covered by base station 202. A base station may be a fixed station used for communicating with the terminals.

In communication over forward links 218 and 224, the transmitting antennas of base station 202 can utilize beamforming in order to improve a signal-to-noise ratio of forward links for the different mobile devices 216 and 222. Also, a base station utilizing beamforming to transmit to mobile devices scattered randomly through its coverage area might cause less interference to mobile devices in neighboring cells than the interference that can be caused by a base station transmitting through a single antenna to all the mobile devices in its coverage area.

In accordance with some aspects, devices 216 and 222 in system 200 can be configured to scan channels of preferred networks before scanning channels associated with other networks, to scan less preferred networks first, or combinations thereof. The scanning order can be dynamically adjusted based on historical data that is gathered over an extended period of time (e.g., days, weeks, months, and so forth). Based on the gathered historical data, access to the more commonly utilized networks is attempted first in order to mitigate the time needed to gain network connectivity. The list of commonly utilized networks can be further sorted to increase performance. Thus, if access to preferred networks is not available, access to less preferred networks can be attempted without scanning channels associated with the preferred networks. In such a manner, network access can be obtained as soon as possible while mitigating the scanning of potential dead channels or channels through which network access cannot be obtained, irrespective whether those dead channels are associated with a home network and/or a roaming network. Further, network access can be obtained in accordance with the disclosed aspects while maintaining usage of preferred systems.

In according with various related aspects, the channel scanning order (e.g., preferred networks before less preferred networks, more commonly utilized networks or less used networks) can be based on smart lists, wherein historical data and location information is utilize together to determine and dynamically adjust the channel scanning order based on location of the user/user device. According to another related aspect, motion is utilized to adjust a scanning order dynamically. Further, if there is a mobile alert and during an ongoing emergency a scanning order can be altered, or in some cases selectively ignored. Additionally or alternatively, devices 216 and 222 in system 200 can be configured to enable network reselection wherein if a less preferred network has been acquired, then periodically (or based on other intervals) scanning for a more preferred networks is automatically performed. Information related to these aspects will be described in further detail below.

Figure 3:
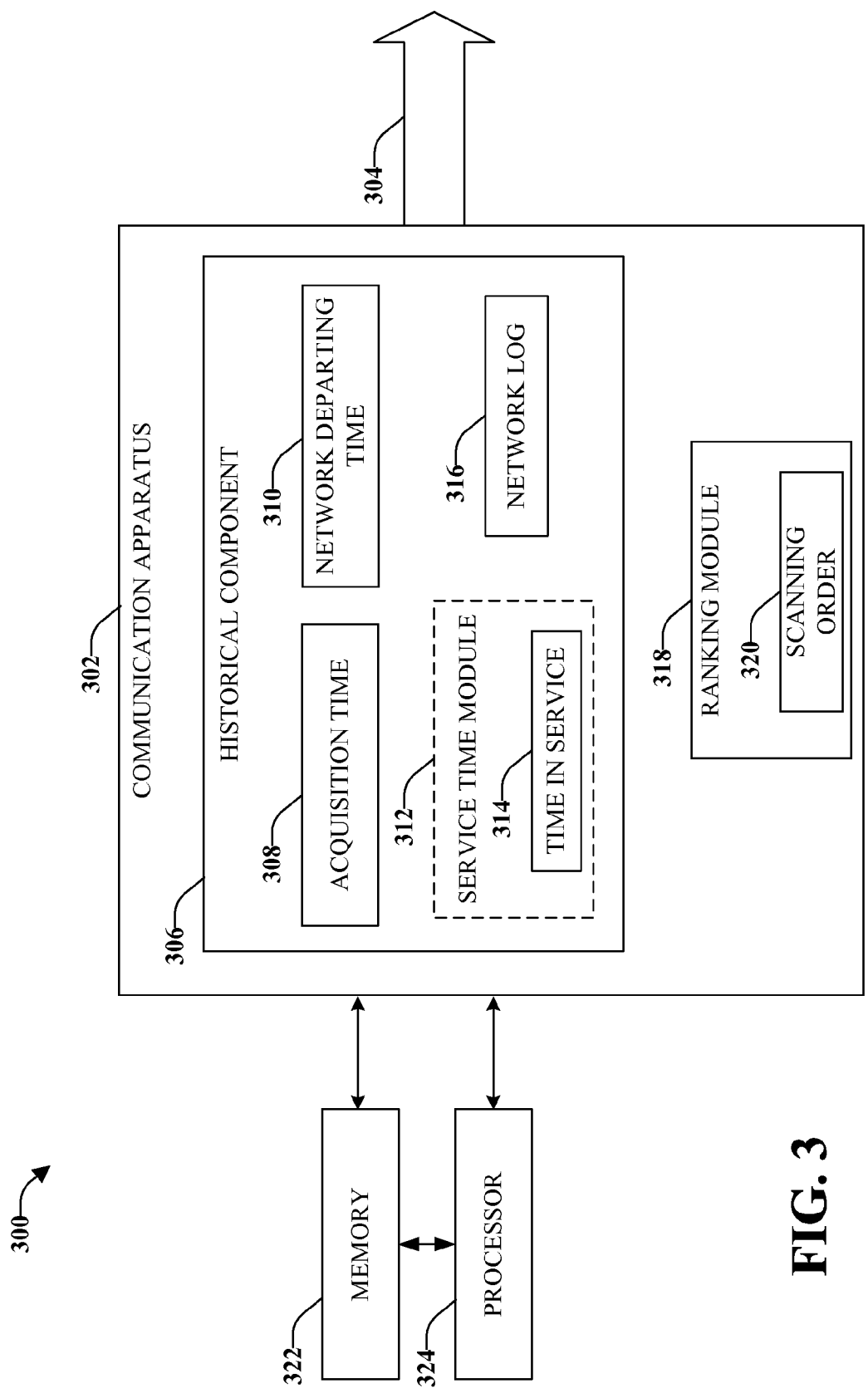
FIG. 3 illustrates a system that is configured to scan channels while a device is out of service, according to an aspect.

FIG. 3 illustrates a system 300 that is configured to scan channels while a device is out of service, according to an aspect. Scanning for dead channels consumes power and can increase time for acquiring a valid network. If preferred network(s) and less preferred network(s) are available, acquiring a preferred network as soon as possible can improve a user experience. System 300 includes a communication apparatus 302 that is shown to be transmitting data through a channel 304. Although depicted as transmitting data, communication apparatus 302 can also receive data through the channel 304 (e.g., communication apparatus 302 can concurrently transmit and receive data, communication apparatus 302 can transmit and receive data at different times, or combinations thereof). Communication apparatus 302, for example, can be an access terminal (e.g., access terminal 104 of FIG. 1; access terminal 216, 222 of FIG. 2) or the like.

Included in communication apparatus 302 is a historical component 306 that is configured to retain information related to networks with which communication apparatus 302 has achieved connectivity (e.g., communication, data transfer, and so on). Instead of reviewing the last channel camped on (e.g., completed access attempt) and making a decision based on that last channel determination, which is a process utilized by some conventional systems, historical component 306 extends the scope of information to cover a longer period of time (e.g., target time period). Based on this extended time period (e.g., hours, days, weeks, months, and so forth), a determination can be made as to how much time has been spent on various networks (preferred networks, less-preferred networks, home networks, roaming networks). By reviewing this historical data, a more refined estimate can be made regarding an order in which network access should be attempted.

Historical component 306 can maintain information related to the history of the networks communication apparatus 302 has acquired over the target time period. This information can relate to the time of network acquisition 308 and the time of departing a network 310 (e.g., a loss of network, directed from the network, and so forth). Based on the time of acquisition 308 and the time of departing the network 310, a service time module 312 can be configured (based on the two timestamps 308 and 310) to calculate a time in service 314 for each of the different networks acquired, if more than one network has been acquired during the target time period. Although service time module 312 is illustrated as included in historical component 306, it should be understood that service time module 312 can be a separate module.

As a function of the time in service 314, a network log can be developed that includes information related to the networks that communication apparatus 302 has utilized during the target time period. The network listing can also include information related to whether the networks are preferred networks or less preferred networks or other attributes. The information retained by network log 316 can be retained for the last n channels, where n is an integer. Further, the number of channels retained can be a predefined number or can be configured by a user, a service provider, a trusted third party, or combinations thereof and/or can be automatically configured by communication apparatus 302.

Based, in part, on the network log 316, a ranking module 318 can determine a scanning order 320. In accordance with some aspects, ranking module 318 can maintain a table (list, chart, and so forth) that corresponds to a preferred scanning order 320. An algorithm that can be utilized by ranking module 318 is that if, within the last T1 minutes of in-service time (e.g., target time period), communication apparatus 302 was served by less preferred networks greater than N1% of time, communication apparatus 302 can attempt to acquire the less preferred network(s) before attempting to acquire the preferred networks. Otherwise, communication apparatus 302 attempts to acquire the preferred networks. In accordance with some aspects, if the time spent on preferred networks and less preferred networks is nearly equal, communication apparatus 302 can be configured to default to the preferred network. However, other configurations are possible with the disclosed aspects.

The value N1% can be a predefined threshold level or a configurable threshold level, wherein if a network is utilized for a percentage of time at or above that threshold level, channels associated with that network are scanned first, before scanning channels of preferred networks. The threshold level (N1%) can be automatically or dynamically adjusted based on the communication environment and/or conditions occurring in the environment.

In accordance with some aspects, the less preferred network(s) can be moved higher in the channel scanning order 320, such as if the less preferred networks are utilized more than N1% of the time. Thus, the channel scanning order 320 can be chosen based on the percentage of time communication apparatus 302 spends on the less preferred network(s). For example, when a network is lost, the next network channel to be scanned for by communication apparatus 302 can be a function of the particular table entries. Thus, if in the last T1 minutes, less preferred networks have been acquired more often, the less preferred networks can be scanned before scanning the preferred networks. By way of example and not limitation, if the less preferred networks (e.g., roaming network) has been utilized for the last hour, this can indicate that more preferred networks (e.g., home network) are not nearby (e.g., user device is not in the area serviced by the home network). If a less preferred network is lost, the less preferred network can be scanned for first, before scanning for a more preferred network, according to an aspect.

In another example, the home network was acquired for the previous two hours and a less preferred network was acquired for a communication ten minutes ago, and connectivity with the less preferred network is lost during the communication. To regain connectivity, the home network can be scanned (not the less preferred network), since the home network is known to be nearby (e.g., was utilized for two hours as recent as ten minutes ago).

In accordance with some aspects, system 300 can be configured to allow network reselection. Thus, if communication apparatus 302 has determined that a more preferred network was not available and a less preferred network (e.g., roaming network) should be acquired, communication apparatus 302 will periodically, or based on other opportunities, check to ascertain whether a preferred network (e.g., home network) is available.

An example of an opportunity to scan for preferred networks is when apparatus 302 just ended a call on a roaming network. Instead of going back to the roaming network after the call ends, there might be an opportunity where apparatus 302 performs a single scan of preferred networks, if previously apparatus 302 spent a majority of the time in the preferred networks.

In another example, every three minutes communication apparatus 302 can scan for one or more preferred networks. Thus, every three minutes (or a different interval) the available networks are probed to determine if a more preferred network is available. If a more preferred network is not available, communication apparatus 302 remains on the less preferred network. If the more preferred network is available, communication apparatus 302 acquires access to that more preferred network. The information related to network reselection can be added to the historical information gathered and retained by historical component 302.

System 300 can include memory 322 operatively coupled to communication apparatus 302. Memory 322 can be external to communication apparatus 302 or can reside within communication apparatus 302. Memory 322 can store information related to calculating a time in service for each network acquired during a target time period. Memory 322 can also retain instructions related to constructing a network log based on the time in service determination, creating a channel scan order that provides a sequence to scan channels in a communication environment based, in part, on the time in service determination, and other suitable information related to signals transmitted and received in a communication network. A processor 324 can be operatively connected to communication apparatus 302 (and/or memory 322) to facilitate analysis of information related to channel scanning in a communication network. Processor 324 can be a processor dedicated to analyzing and/or generating information received by communication apparatus 302, a processor that controls one or more components of system 300, and/or a processor that both analyzes and generates information received by communication apparatus 302 and controls one or more components of system 300.

Memory 322 can store protocols associated with channel scanning, taking action to control communication between communication apparatus 302 and other devices or nodes such that system 300 can employ stored protocols and/or algorithms to achieve improved communications in a wireless network as described herein.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 4:
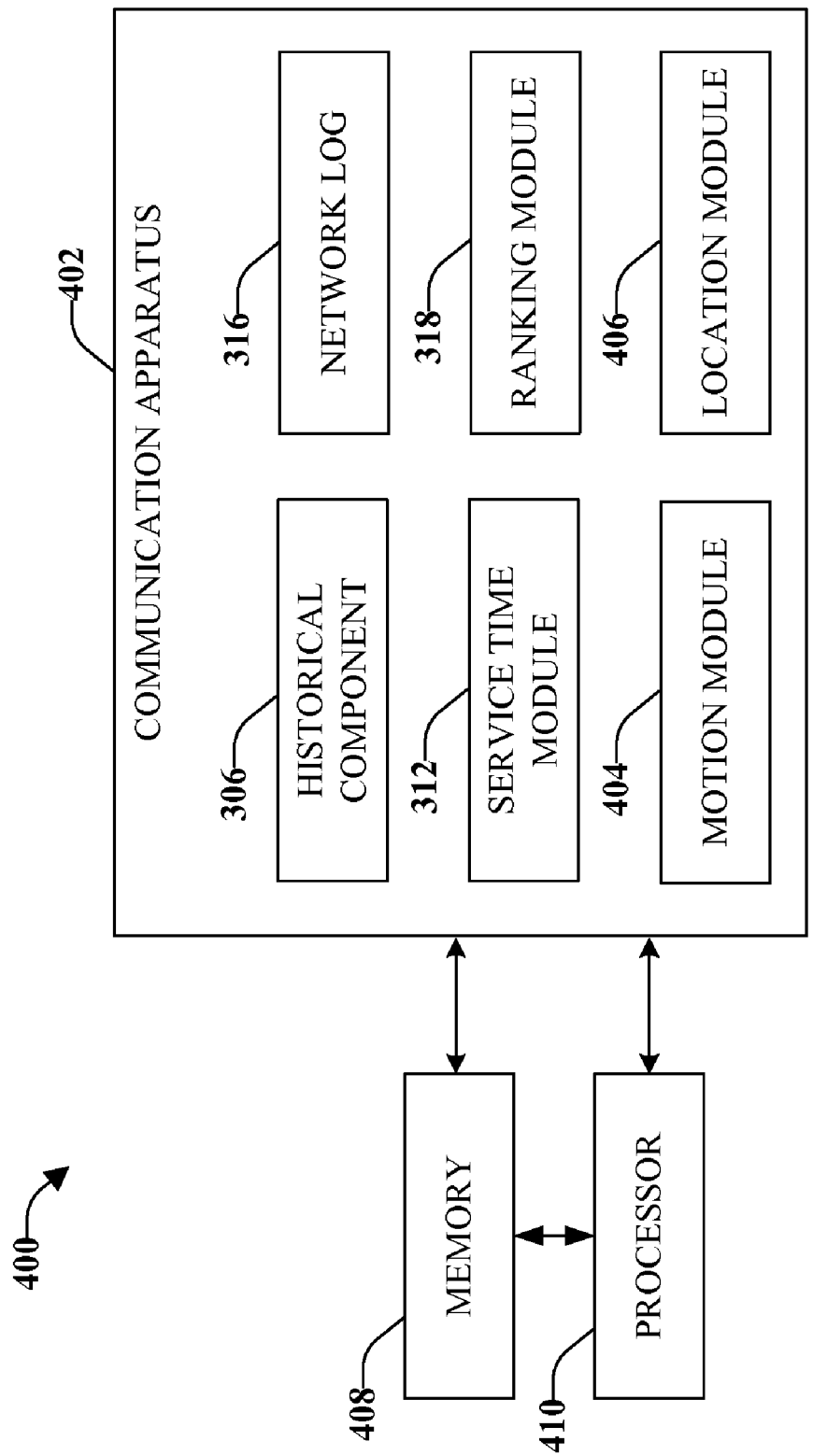
FIG. 4 illustrates a system for utilizing motion as a function of determining a network channel scanning order in accordance with the disclosed aspects.

FIG. 4 illustrates a system 400 for utilizing motion as a function of determining a network channel scanning order in accordance with the disclosed aspects. Motion provides for additional information that relates to speed, direction, altitude, and other characteristics of device movement.

In accordance with this aspect, system 400 includes a communication apparatus 402 (similar to apparatus 302 of FIG. 3). Included in communication apparatus 402 is a historical component 306 that is configured to gather (e.g., receive, request, sample, and so forth) data related to networks that have been acquired (and which have served communication apparatus 402) during a certain period of in-service time (T1 minutes). The in-service time period can be pre-configured, automatically configured by communication apparatus 402, and/or can be configured by a user, a service provider, and/or a trusted third party (e.g., authorized retailer of service provider). Based on the information gathered by historical component 306, a service time module 312 determines a time in service for each network as a function of a time access to network was gained and a time apparatus 402 departed from the network (e.g., access to network was lost, apparatus 402 was directed by network to change to a different frequency, handoff, and so forth).

A network log 316 can retain information for each network access by communication apparatus. According to some aspects, the network information is maintained for the last n channels accessed by communication apparatus 402. However, the disclosed aspects are not so limited and network log 316 can maintain any number of channels. The network log 316 can also include information associated with each network, such as whether the network is a preferred network, a non-preferred network, a roaming network, a home network, and so forth.

Also included in wireless apparatus 402 is a motion module 404 that is configured to sense motion (or lack of motion) of communication apparatus 402. Motion module 402 can detect and track speed, direction, altitude, and so forth. Motion can be utilized in combination with historical information in order for ranking module 318 to provide a channel scanning list (table, chart, and so forth) in order to determine in which order channels should be scanned to obtain network connectivity in a shorter amount of time (versus scanning channels that are not available).

Generally, the channel scanning order provided by ranking module 318 is a pattern of channels to scan (e.g., a fixed pattern, an updatable pattern, and so forth). This scanning pattern can be utilized regardless of whether apparatus is in an area with limited, if any coverage (e.g., "bad spot", "dead spot", "dead zone", and so forth) or is being moved from place to place. For example, apparatus 402 can be in a dead spot with respect to a preferred network (or service provider) in a small section of a geographic area. However, in that small geographic area (or pocket of service), apparatus 302 can receive a signal from a roaming service.

In accordance with some aspects, the channel scanning pattern can be continuously scanned (e.g., in a looping or circular manner), wherein the preferred network is scanned first (since apparatus 402 is in range of the preferred network). However, if connectivity with the preferred network is lost (and cannot be regained after a certain number of re-access attempts) and motion module 404 detects that communication apparatus 402 is not moving, the scanning pattern is dynamically changed or updated.

For example, a channel that was obtained (e.g., preferred network channel) is lost and cannot be re-acquired (e.g., because apparatus 402 is in a dead spot). If that lost channel is a channel within the scanning pattern, that channel can be skipped if motion is not detected by motion module 404 since that channel is in a dead zone and apparatus 402 is not moving, thus, the channel remains in the dead zone. In such a manner, resources are not wasted by attempts to obtain a channel that is known to be non-accessible.

In accordance with some aspects, ranking module 318 can be configured to maintain more than one scanning pattern. For example, a first scanning pattern can be utilized when motion is detected by motion module 404 and a second scanning pattern can be utilized if motion is not detected by motion module 404.

According to some aspects, if motion module 404 does not detect movement, and there are no channels found in the preferred networks, the preferred networks can be scanned a fewer number of times and/or less preferred networks can be scanned more frequently and/or sooner.

In accordance with some aspects, there can be a multiple-access network that includes a first network type and a second network type (e.g., CDMA, GSM, and so forth). If communication apparatus 402 is in a dead spot with respect to the first network, the second network can be scanned sooner, if motion module 404 detects that communication apparatus 402 is not moving. In such a manner, time and other system 400 resources (e.g., battery power, wireless bandwidth, and so forth) are not utilized to go through channels of the first network when it is known that there is not access available for that first network (e.g., apparatus 402 is not moving). At substantially the same time as motion module 404 detects that communication apparatus 402 is being moved, the first network (e.g., more preferred network) can be once again scanned in the event that channels associated with the first network can now be accessed. In accordance with some aspects, once communication apparatus 402 is being moved, the more preferred networks can be scanned more often and/or for a longer time range.

Additionally or alternatively, apparatus 402 includes a location module 408 that is configured to ascertain a location of apparatus 402. The location can be ascertained through various locating means including, but not limited to, a Global Positioning System (GPS). When a network is departed from, location module 408 can ascertain the position of apparatus 404 and the position information can be retained by historical component 306 or another component. Further, a database, such as network log 316 or ranking module 318, can retain information related to networks that were previously accessible at the particular location and/or the networks that are accessible after departing a network in that location. Historical information related to the location where a network loss occurred and the probability of a channel being available at that location can be utilized to modify a channel scanning order. Thus, the channel scanning order can be influenced, in part, by the historical location and channel availability information.

A memory 408 can be operatively coupled (e.g., external, internal) to communication apparatus 402. Memory 408 can retain instructions related to creating a ranked order of channel scanning preferences as a function of historical data and motion (or lack of motion) of communication apparatus 402. A processor 410 can be operatively connected to communication apparatus 402 (and/or memory 408) to facilitate analysis of information related to channel scanning in a communication network.

Figure 5:
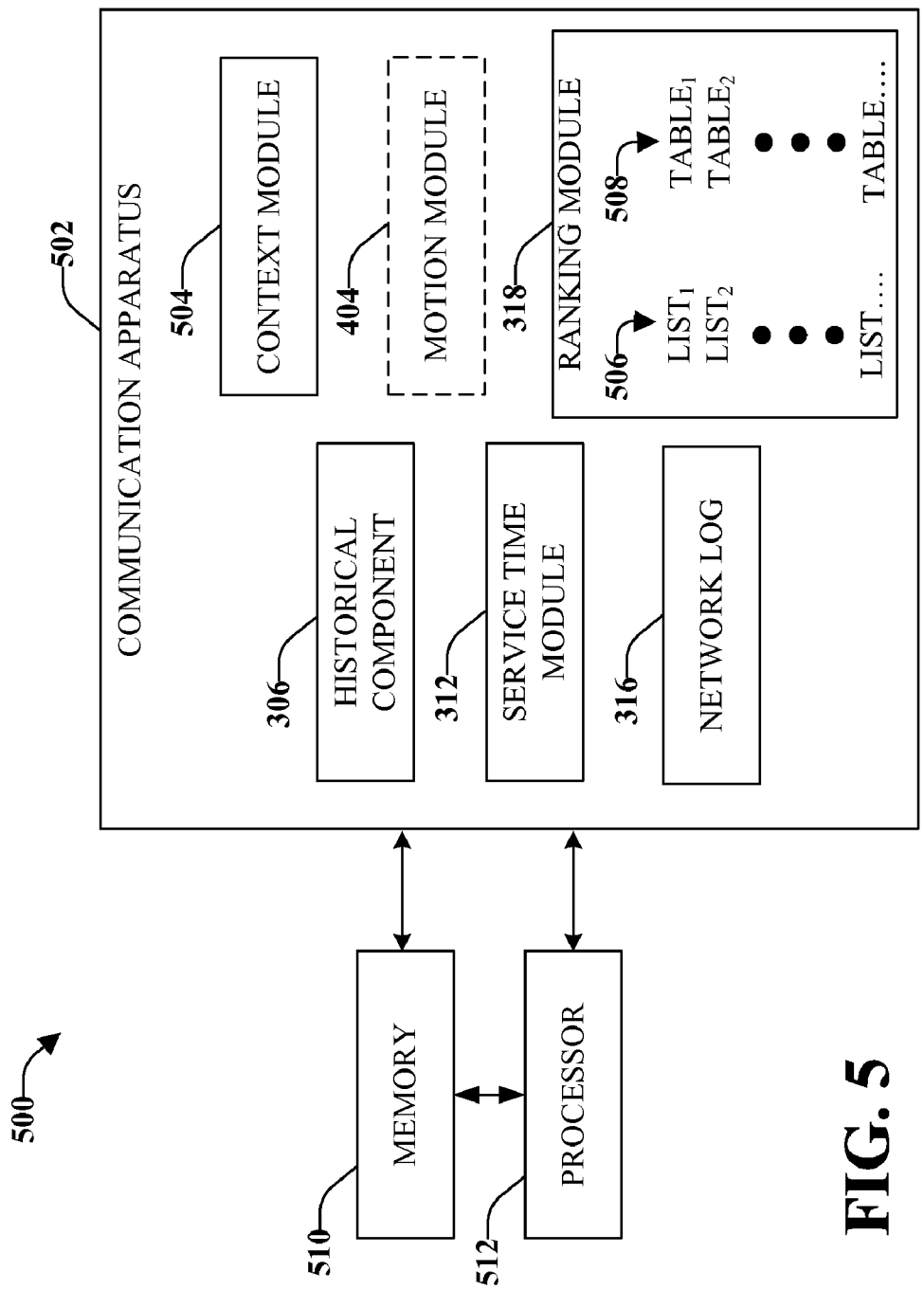
FIG. 5 illustrates a system for utilizing smart lists in accordance with an aspect.

With reference now to FIG. 5, illustrated is a system 500 for utilizing smart lists in accordance with an aspect. System 500 includes a communication apparatus 502 (similar to the communication apparatuses of the above figures) that includes a historical component 306 that gathers historical information related to apparatus 502 performance and operation. A service time module 312 determines an amount of time in service (T1) for each network as a function of a time of network acquisition and a network depart time. A network log 316 is created that includes the time in service for each network, and the preference level for each network (e.g., most preferred network, more preferred network, preferred network, less preferred network, least preferred network, and so forth).

Also included in communication apparatus 502 is a context module 504 that is configured to analyze the circumstances related to a most recently utilized network. Based on the circumstances, ranking module 318 can create a number of smart lists, illustrated as a multitude of lists 506 and/or a multitude of tables 508, although other means of ranking channels can be utilized in accordance with the disclosed aspects. The lists 506 and/or tables 508 can be smart lists, smart tables, other ranking parameters, and so forth, and can have attached attributes or contexts (e.g., conditions, historical parameters, location, and so forth). A context or attribute can include networks that are historically accessed after a certain condition is experienced (e.g., powering off apparatus 502, departing a network without losing power, and so forth). Another context/attribute can include whether and how apparatus 502 was powered off. For example, was apparatus 502 powered off manually by the user (e.g., due to an airplane flight) and/or due to a power or battery failure (e.g., the battery just needs to be recharged but apparatus 502 most likely has not entered a different geographic area). A further context/attribute can include the length of time apparatus 502 was powered off. Additionally, various combinations of contexts/attributes can be utilized to determine which list (table and so forth) should be accessed in an attempt to enable faster network connectivity.

For example, if user is operating apparatus 502 and a network is departed from without apparatus 502 being powered off, a first smart list can be utilized. Departing the network without powering off the apparatus 502 can indicate that the apparatus 502 was moved to an area with limited or no connectivity (e.g., in a tunnel, underground, and so forth). Thus, the first smart list that contains the networks most recently accessed can be utilized. However, if the user goes through the process of powering off apparatus 502, a separate list of channels that should be scanned can be utilized upon power up. These separate lists of channels can relate to different locations (e.g., different countries) or based on other conditions, such as the length of time the device was "off".

By way of example and not limitation, a user of communication apparatus 502 might travel between two or more states (or other locations) frequently and thus, there can be two, three, or more most recently utilized networks. If the apparatus 502 is powered off for an airplane flight and powered back on after completion of the flight, a ranking module 318 might take attributes, such as length of time apparatus 502 was powered off, into consideration to determine a channel scanning order. Thus, if the apparatus 502 was powered off for three hours, it might indicate that the user is now in a second location and a second channel scanning order 506, 508 should be utilized. However, if apparatus 502 was powered off for seven hours, it might indicate that a third scanning order 506, 508 (associated with a third location) should be utilized, and so forth.

In accordance with some aspects, a motion module 404 can also be included in apparatus 502. It should be noted that motion module 404 is optional, as denoted by the dashed box. Through utilization of a motion module 404 speed, direction, and/or altitude of apparatus 502 can be determined. Based on this information, communication apparatus 502 can ascertain that it is located in an airplane, for example, and that since apparatus 502 is out of service (or should not be utilized) channels will not be scanned in order to conserve power and other resources. In accordance with some aspects, motion module 404 can detect that apparatus 502 is in an airplane, which can be indicated based on motion detection (e.g., high speed and high altitude scenario). Based on this detection, different lists 506 and/or tables 508 can be accessed in order to acquire certain channels at substantially the same time as apparatus 502 is in a new scenario (e.g., no longer in an airplane). Additionally or alternatively, when motion is no longer detected by motion module 404 (e.g., airplane is no longer in flight), other criteria can be taken into consideration (e.g., geographic coordinates, direction of motion) by ranking module 318 in order to determine a scanning order 506, 508.

Additionally or alternatively, context module 504 can evaluate an "airplane mode" that is utilized when a user is traveling on a plane (e.g., to suspend wireless communications while in flight). For example, a modem (not shown) associated with apparatus 502 can be powered off for the flight, however, motion module 404 can still be active. Motion module 404 can detect the direction of travel, the altitude of travel, and/or the speed of travel, which can be utilized by context module 504 to analyze the circumstances in order to improve system selection performance.

For example, apparatus 502 might be on the ground at an airport and still has service (e.g., connectivity with a network). The user might forget to power down the apparatus 502 and, as the plane takes off, apparatus 502 loses a land-based system and motion module 404 detects apparatus 502 is now in the air traveling at airplane speed and is at flying altitude. Then the apparatus 502 searches for plane-based networks automatically and the plane-based networks might be utilized (if available). When context module 504 detects that apparatus 502 is again on the ground, the land based networks can automatically be searched for and utilized.

In another example, apparatus 502 can be powered off, airplane mode invoked, and motion module 404 can detect the direction and length of travel. This information can be utilized by context module 504 to narrow down a search, whereby a smart list of channels to scan is created in order to increase system selection performance.

System 500 also includes a memory 510 operatively coupled, externally or internally, to communication apparatus 502 and a processor 512 operatively connected to communication apparatus 502 (and/or memory 510). Memory 510 can retain information related to creating smart lists (smart tables and so forth) of one or more channel scanning preferences, wherein the created lists are a function of a context of communication apparatus 502. Processor 512 can be configured to execute the instructions retained in memory 510.

Figure 6:
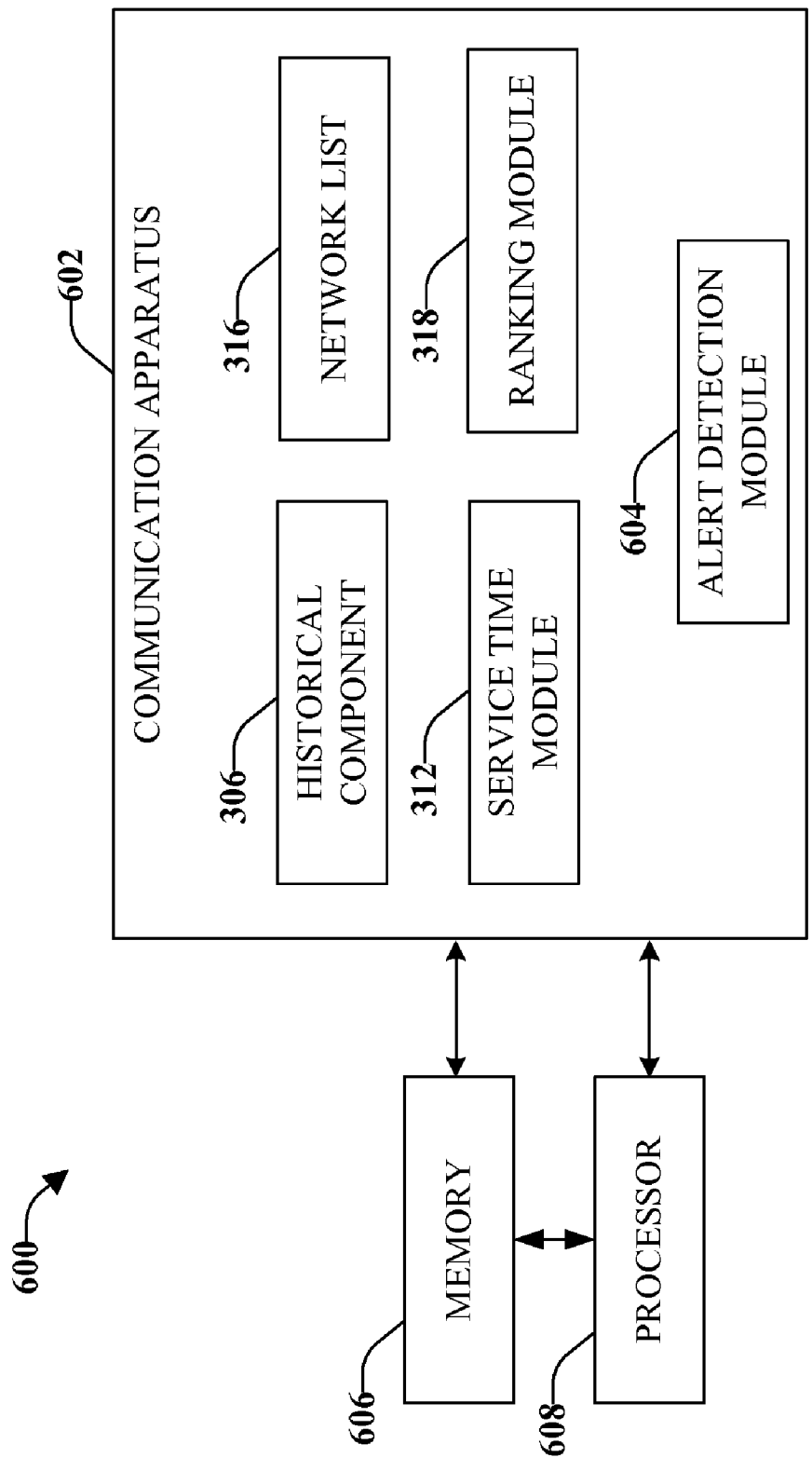
FIG. 6 illustrates a system for dynamically modifying and/or deliberately ignoring a channel scanning order as a function of a mobile alert system, according to an aspect.

FIG. 6 illustrates a system 600 for dynamically modifying and/or deliberately ignoring a channel scanning order as a function of a mobile alert system, according to an aspect. Commercial mobile alert systems are designed to allow wireless carriers (or networks) to transmit emergency alerts to devices within a geographic area. Mobile alert systems (sometimes referred to as mobile location-based services) are gaining popularity among users and service providers. These location-based services can be utilized to deliver emergency, advertising, traffic alerts, and other information.

System 600 includes a communication apparatus 602 that is similar to the communication apparatuses of the above figures. Included in communication apparatus 602 is a historical component 306 that gathers historical information and a service time module 312 that determines an in service time associated with each network. Based in part on the historical information and a time in service, a network list 316 is generated. As a function of the network list 316, a ranking module 318 determines a scanning order (or multiple scanning orders) that can be utilized to scan channels to obtain network access, to obtain preferred networks before less preferred networks, and so forth.

According to some provisions associated with mobile alert systems, service providers have roaming agreements with other wireless carriers (e.g., roaming networks) and subscribers for those service providers are allowed to access the roaming networks to retrieve the respective alerts. A potential implication can be that there is an emergency occurring and wireless communication 602 has lost service on a preferred network. Due to performance considerations and/or revenue consciousness, a home network is generally preferred over a roaming network. However, in the event of an emergency (or another mobile alert) an alert detection module 604 can be configured to recognize that the alert (which can be a broadcast message) has been received at communication apparatus 602. It should be noted that the user should be subscribed to the alert system and, further, that communication apparatus 602 is configured to obtain alerts on the different channels.

At substantially the same time as the alert is recognized by alert detection module 604, ranking module 318 can dynamically modify the scanning order. In accordance with some aspects, the scanning order can be selectively ignored so that communication apparatus 602 can utilize either preferred networks or roaming networks in order to quickly obtain and present subsequent alerts to the user and to provide service (e.g., access to voice data and Short Message Service (SMS)) as soon as possible back to apparatus 602. The scanning order can be modified and/or ignored for a certain interval of time (e.g., a predefined period, a configurable period of time, until expiration of a validity time period include in the alert message (that indicated the alert valid for the next hour or up to a particular time/day), and so forth).

For example, the scanning order or pattern can employ a different pattern in the event of an emergency event, such as an alert message. In accordance with some aspects, revenue or other costs associated with a roaming network can be disregarded when there is an alert message. By way of example and not limitation, communication apparatus 602 quickly scans each channel by power level such that the channels with the highest amount of power (indicating the channel is likely to find a signal first) are scanned before channels with a lower amount of power.

A memory 606 and a processor 608 are operatively coupled, externally or internally, to communication apparatus 602. Memory 606 retains information related to modifying and/or ignoring a channel scanning order based on messages from an alert system. Processor 608 is configured to execute the instructions retained in memory 606.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
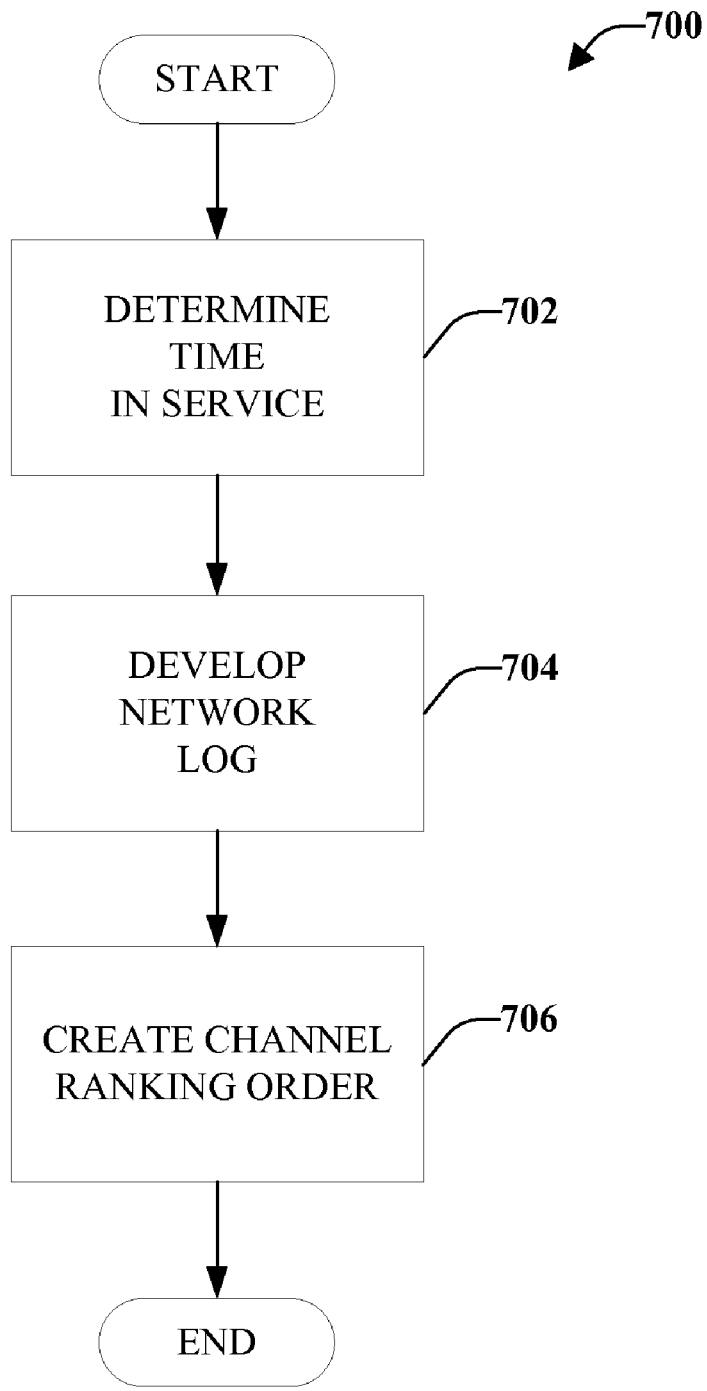
FIG. 7 illustrates a method for scanning channels while a device is out of service.

FIG. 7 illustrates a method 700 for scanning channels while a device is out of service. Since scanning for dead channels consumes power and increases time for acquiring a valid network, method 700 can selectively create a scanning order in order to mitigate an amount of time and other system resources necessary for scanning dead channels.

Method 700 starts, at 702, when a time in service is determined as a function of historical network acquisition times and a historical network depart times. The network acquisition times and/or network depart times can be associated with information related to various networks (e.g., home network, roaming network, and so forth). The time in service, network acquisition time, and network depart time can be retained as historical information that covers an extended amount of time (e.g., hours, days, years, months, and so forth). Depart times can include, but are not limited to, losing access to a network, notification by network to change to a different frequency, handoff, and so forth.

At 704, a network log is created based, in part, on the time in service determination. The network log can include a listing of a predefined or configurable number of channels or can contain an unlimited number of channels. The network log can also include information related to whether each network is a preferred network, a non-preferred network, or other information.

A channel ranking order is created, at 706. The channel ranking order provides a sequence for scanning channels in a communications environment. For example, networks accessed by a device are tracked for a predefined or configurable in service time (T1 minutes). If the device was served by less preferred networks during that T1 time more often than preferred networks (e.g., at or above a threshold level, N1%), method 700 can attempt to acquire other less preferred networks before attempting to acquire the preferred networks and/or the less preferred networks are moved to a higher ranking in the channel scanning order. If the device was served by preferred networks more than the non-preferred networks (e.g., served by preferred network at or above the threshold level N1%), a channel scanning order that searches for preferred networks first is utilized. In such a manner, history related to a mobile device's environment can create a more optimal channel scanning algorithm (method or other technique) to mitigate power consumption and increase the speed of acquiring a preferred network.

Figure 8:
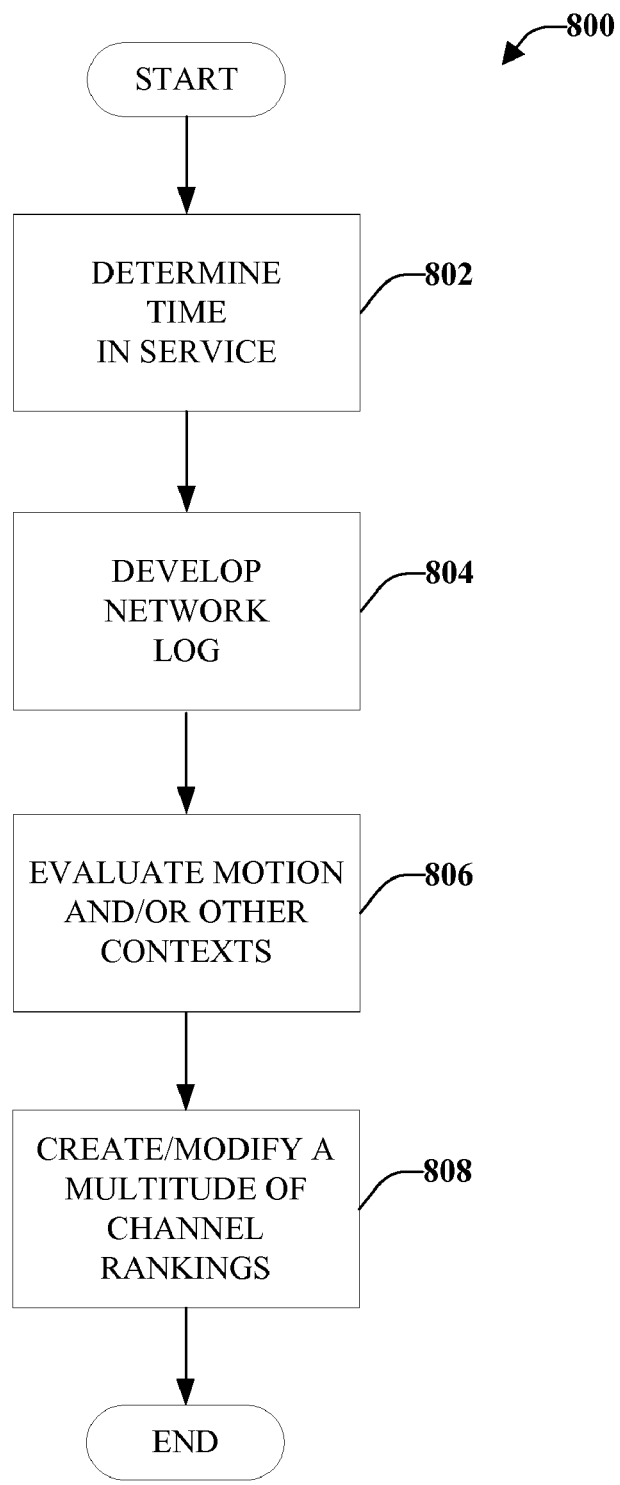
FIG. 8 illustrates a method for utilizing motion and/or other contexts as a function of determining a network channel scanning order in accordance with the disclosed aspects.

FIG. 8 illustrates a method 800 for utilizing motion and/or other contexts as a function of determining a network channel scanning order in accordance with the disclosed aspects. Method 800 can provide context sensitive scanning or "smart" scanning that changes as a function of one or more contexts associated with a mobile device. Method 800 starts, at 802, when a time in service (T1) is determined as a function of a time of network acquisition and a time of leaving a network. The time in service (T1) is captured for each network acquired and is retained, at 804, in a network list. The network list can also include information related to whether the network is a preferred network, a non-preferred network, and so on.

At 806, motion, location, and/or other contexts are evaluated. For example, motion information can detect and track speed, direction, altitude, and so forth. This motion information can be utilized in conjunction with historical information maintained in the network listing to create or modify, at 808, a multitude of channel ranking lists, tables, charts, and so forth. For example, the motion information can be utilized (with the historical information) to determine in which order channels should be scanned to obtain network connectivity in a shorter amount of time (versus scanning channels that are not available).

Additionally or alternatively, contexts that analyze the circumstances related to a most recently utilized network can be combined with historical information (and/or motion information). Other contexts include whether and how apparatus was powered off and/or the length of time apparatus was powered off, as well as other information. Based on the context, historical, and other information, a number of smart lists can be created, at 808. If one or more channel rankings were already created, each channel ranking can be selectively modified based on the information evaluated, at 806.

Figure 9:
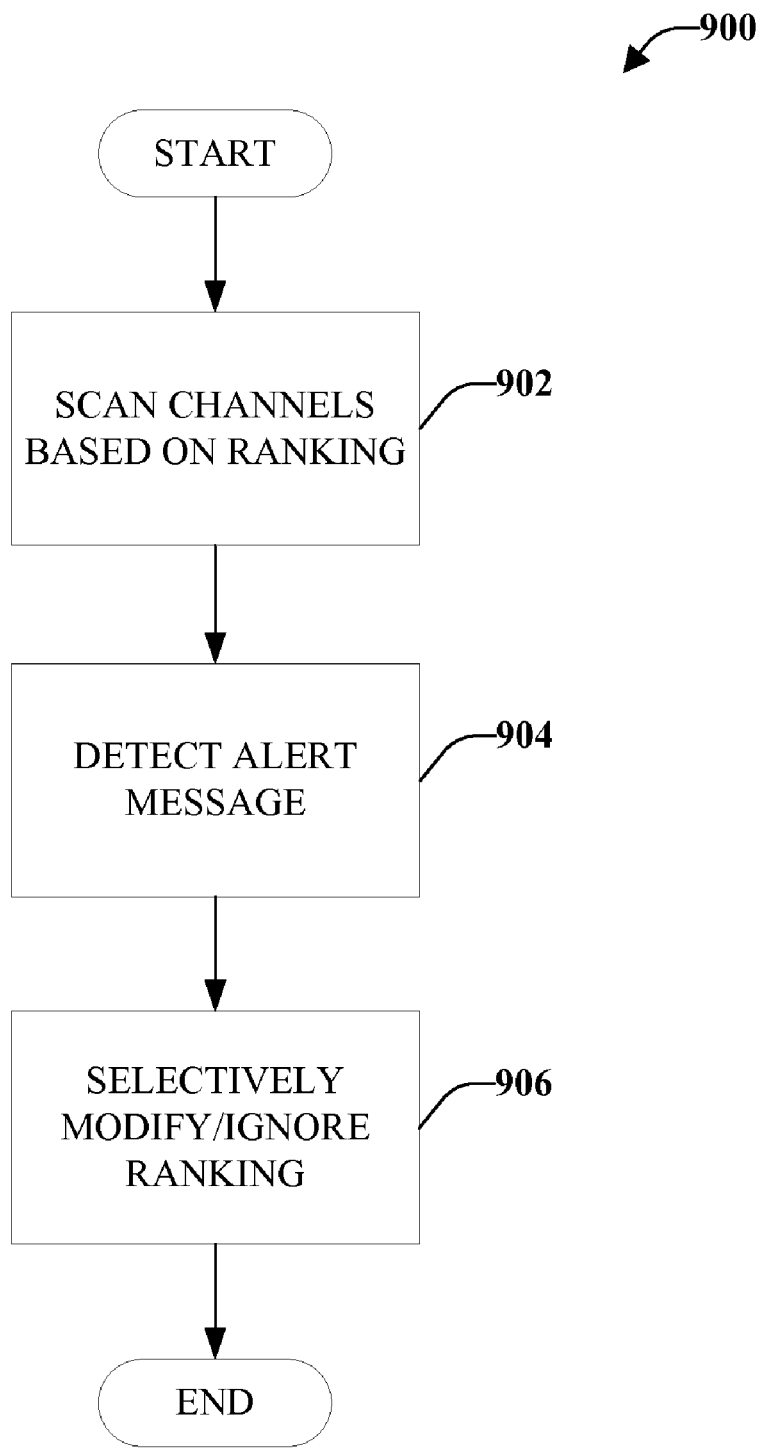
FIG. 9 illustrates a method for selectively modifying and/or ignoring a channel scanning order or ranking as a function of an alert message.

FIG. 9 illustrates a method 900 for selectively modifying and/or ignoring a channel scanning order or ranking as a function of an alert message. The alert message can include various types of information intended for a multitude of users in a particular geographic area. Such alert messages include emergency messages, advertisements, traffic information, local interest information, as well as other information intended for a wide range of users that have subscribed to an alert message service.

At 902, channels are scanned based on a channel ranking (or scanning order). This channel ranking can be established based on historical information, context information, motion information, location information, user preferences (e.g., home network preferred, roaming network less preferred, and so forth), or combinations thereof.

An alert message is received, at 904, if the device is enabled to receive the alert messages (e.g., device user has subscribed to the service, the service is available in the communication network, the device user has enabled the service, and so forth). The device can receive a first alert message, interpret the alert, and decide that there is an important (e.g., emergency) message for the device user.

For example, the alert message relates to an emergency situation (e.g., emergency weather situation, building fire, bank robbery, Amber alert, and so forth). The type of alert messages that can cause the channel scanning order/ranking to be modified can be selected by the user, such as through a user interface. There can be a field or another indication in the alert message that conveys information as to the type of alert (e.g., emergency, traffic, advertising, interesting local information, and so forth). Thus, if a user is interested in traffic alert messages, any traffic alert message would cause the channel scanning order/ranking to be modified/ignored, as needed.

Based on the received alert message, the channel scanning order/ranking is selectively modified and/or ignored, at 906. In accordance with some aspects, the channel scanning order/ranking is modified/ignored for a certain time interval (e.g., one hour after receiving the first alert message). For example, the scanning order can be modified such that channels are scanned based on descending order of power level, wherein channels with the highest power level are scanned first, regardless of whether the channel is on a preferred network or a non-preferred network.

In another example, a first alert message is received that includes a field to indicate a type of emergency. Based on this first alert message, the device is placed in a mode such that for a time window (e.g., fixed time period, until expiration of the alert message if the alert message includes a validity period), the device modifies and/or ignores the channeling scanning order established in order to receive any subsequent alert messages quicker. For example, if during the validity period, the device loses service (e.g., loses connectivity with a network), since service should be re-established as quickly as possible (to receive the alert messages), it is acceptable to access a less preferred network (or roaming network) and incur charges associated therewith in order to remain up-to-date on the alert.

In a further example, if the user is receiving emergency alerts, that user might want to be able to contact people (e.g., family, friends, emergency services, and so forth). Thus, the user would not want the device to spend time (e.g., a few seconds) searching for preferred networks but would instead prefer that the channel scanning order is ignored and network service established with any available network.

Figure 10:
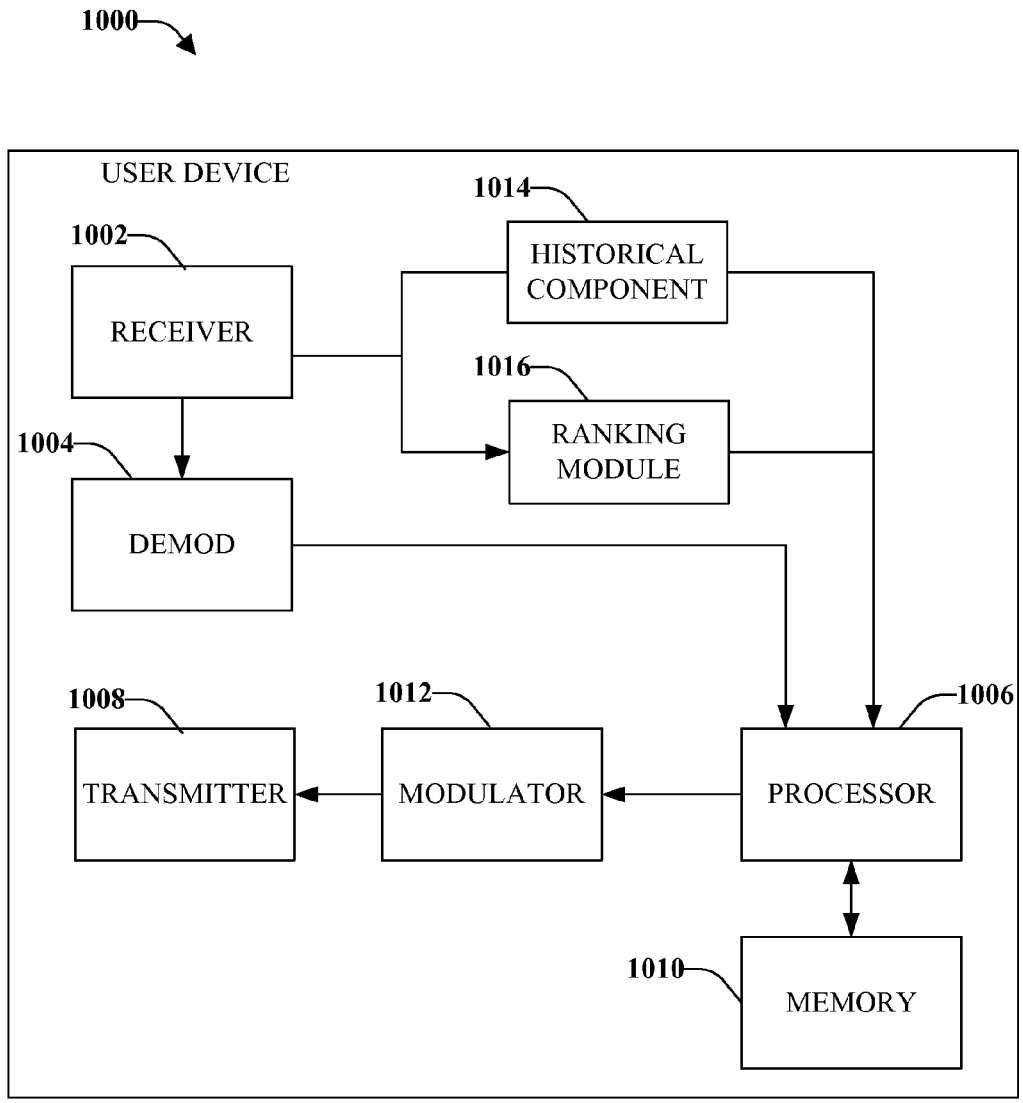
FIG. 10 illustrates a system that facilitates scanning channels in a more desirable order to mitigate power consumption and increase acquisition of a preferred network in accordance with one or more of the disclosed aspects.

With reference now to FIG. 10, illustrated is a system 1000 that facilitates scanning channels in a more desirable order to mitigate power consumption and increase acquisition of preferred networks (e.g., home network) in accordance with one or more of the disclosed aspects. System 1000 can reside in a user device and comprises a receiver 1002 that can receive a signal from, for example, a receiver antenna. The receiver 1002 can perform typical actions thereon, such as filtering, amplifying, downconverting, etc. the received signal. The receiver 1002 can also digitize the conditioned signal to obtain samples. A demodulator 1004 can obtain received symbols for each symbol period, as well as provide received symbols to a processor 1006.

Processor 1006 can be a processor dedicated to analyzing information received by receiver component 1002 and/or generating information for transmission by a transmitter 1008. In addition or alternatively, processor 1006 can control one or more components of user device 1000, analyze information received by receiver 1002, generate information for transmission by transmitter 1008, and/or control one or more components of user device 1000. Processor 1006 may include a controller component capable of coordinating communications with additional user devices.

User device 1000 can additionally comprise memory 1008 operatively coupled to processor 1006 and that can store information related to coordinating communications and any other suitable information. Memory 1010 can additionally store protocols associated with channel scanning.

Receiver 1002 is further operatively coupled to a historical component 1014 that is configured to gather historical information related to system 1000 and its environment. Historical information includes, but is not limited to, a time in service for one or more networks, network preferences, attributes, and other information. Additionally, receiver 1002 can be operatively coupled to a ranking module 1016 that is configured to generate one or more arrangements for scanning channels. The channel scanning arrangements can be constructed to mitigate usage of system resources while increasing network acquisition time.

Figure 11:
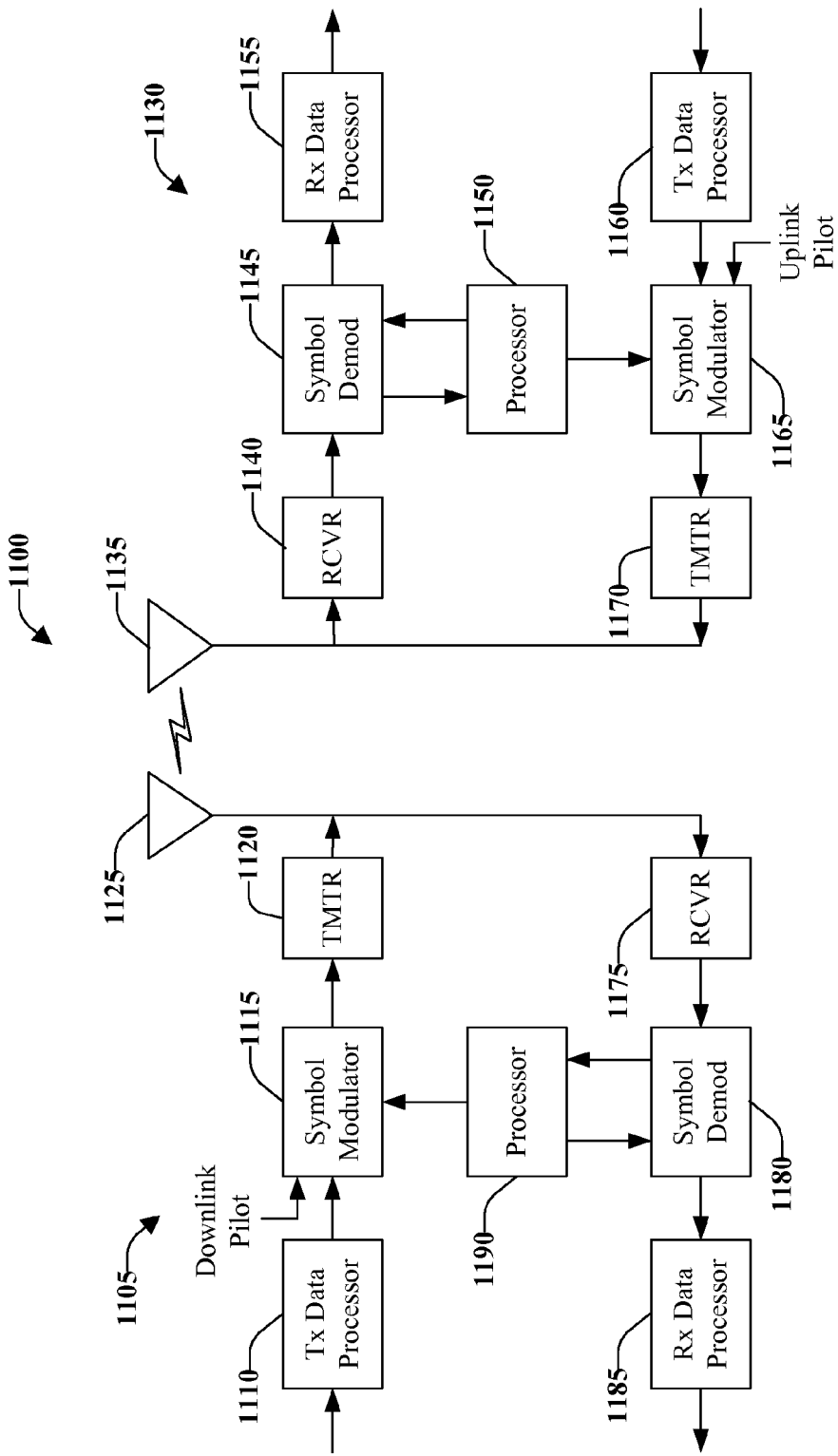
FIG. 11 illustrates an exemplary wireless communication system.

FIG. 11 illustrates an exemplary wireless communication system 1100. Wireless communication system 1100 depicts one base station and one terminal for sake of brevity. However, it is to be appreciated that system 1100 can include more than one base station or access point and/or more than one terminal or user device, wherein additional base stations and/or or terminals can be substantially similar or different from the exemplary base station and terminal described below. In addition, it is to be appreciated that the base station and/or the terminal can employ the systems and/or methods described herein to facilitate wireless communication there between.

Referring now to FIG. 11, on a downlink, at access point 1105, a transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1115 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 obtains N received symbols and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

On the uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 11105.

At access point 1105, the uplink signal from terminal 1130 is received by the antenna 1125 and processed by a receiver unit 1175 to obtain samples. A symbol demodulator 1180 then processes the samples and provides received pilot symbols and data symbol estimates for the uplink. An RX data processor 1185 processes the data symbol estimates to recover the traffic data transmitted by terminal 1130. A processor 1190 performs channel estimation for each active terminal transmitting on the uplink.

Processors 1190 and 1150 direct (e.g., control, coordinate, manage, . . . ) operation at access point 1105 and terminal 1130, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1190 and 1150.

Figure 12:
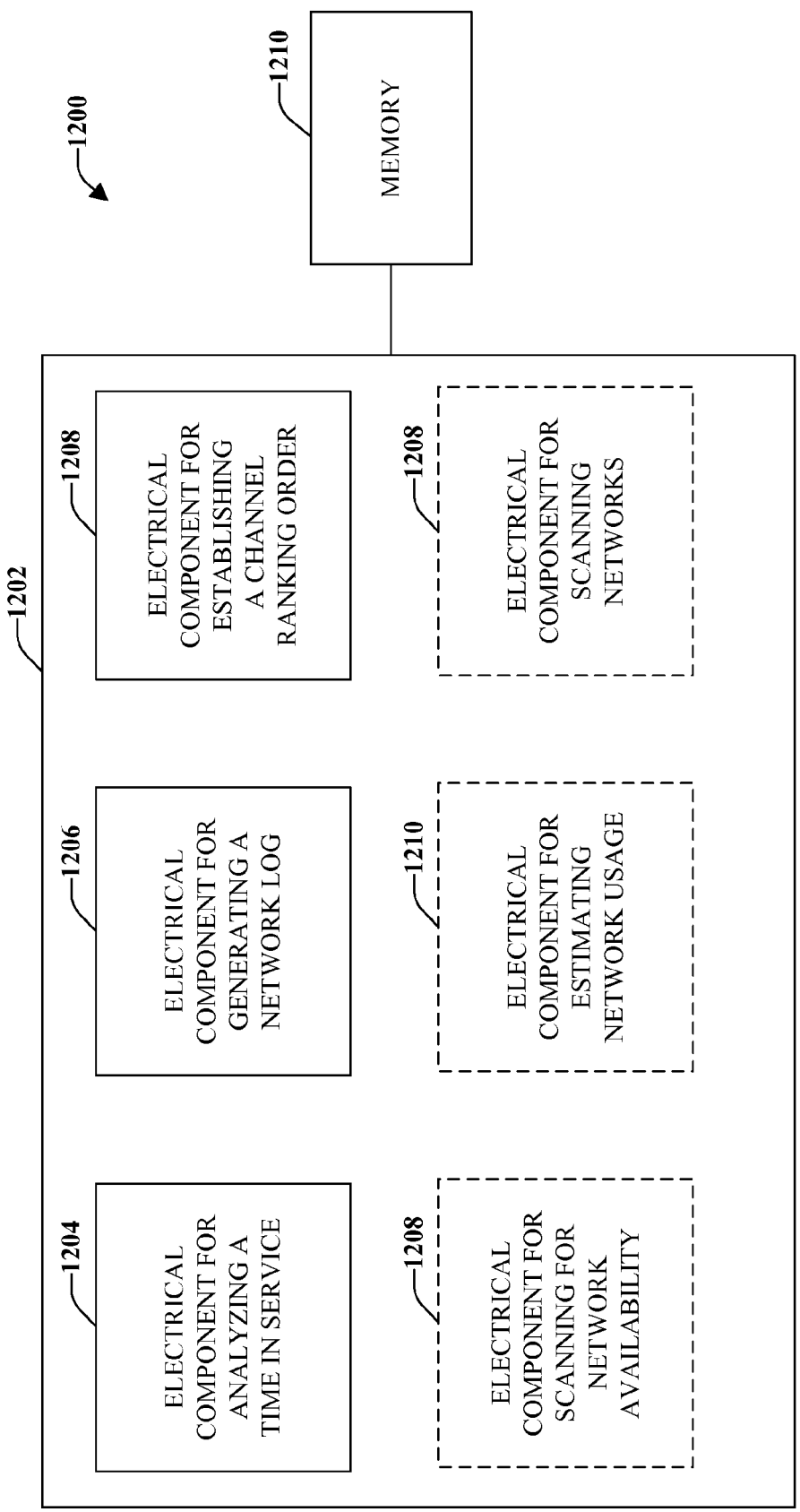
FIG. 12 illustrates an example system that dynamically scans channels in a communications environment, according to an aspect.

With reference to FIG. 12, illustrated is an example system 1200 that dynamically scans channels in a communications environment, according to an aspect. System 1200 can reside at least partially within a mobile device. It is to be appreciated that system 1200 is represented as including functional blocks, which may be functional blocks that represent functions implemented by a processor, software, or combination thereof (e.g., firmware).

System 1200 includes a logical grouping 1202 of electrical components that can act separately or in conjunction. Logical grouping 1202 includes an electrical component 1204 for analyzing a time in service for a mobile device. The time in service can be ascertained as a function of historical acquisition times and historical network depart times. Also included in logical grouping 1202 is an electrical component 1206 for generating a network log, which can be developed based on the time in service determination. The network log can include information related to whether each network is a home network or a roaming network. Further, logical grouping 1202 includes an electrical component 1208 for establishing a channel scan order based, in part, on the time in service determination. The channel scan order provides an arrangement for scanning channels in a communications environment.

According to some aspects, logical grouping 1202 can include an electrical component 1208 for scanning for availability of a preferred network during a network reselection attempt if a less preferred network is currently serving the mobile device. The scanning can be performed periodically or based on other opportunities.

In accordance with some aspects, logical grouping 1202 can include an electrical component 1210 for estimating network usage. For example, if electrical component 1210 estimates that less preferred networks served communication apparatus greater than threshold percentage of time, an electrical component 1212 for scanning networks can scan less preferred networks more often than scanning for preferred networks. According to some aspects, if electrical component 1210 estimates that less preferred networks did not serve the wireless communication apparatus greater than a threshold percentage of time, electrical component 1212 attempts to acquire a preferred network before attempting to acquire a less preferred network.

Additionally or alternatively, logical grouping 1202 can include an electrical component for evaluating motion information associated with the mobile device and an electrical component for utilizing the motion information (with the historical information) to create the channel ranking order. The motion information includes speed, direction, and altitude data.

In accordance with some aspects, logical grouping 1202 can include an electrical component for evaluating a context associated with the communication environment, the mobile device, or combinations thereof. Logical grouping 1202 can also include an electrical component for utilizing the context information (with the historical information) to create the channel ranking order.

Additionally, system 1200 can include a memory 1210 that retains instructions for executing functions associated with electrical components 1204, 1206, and 1208 or other components. While shown as being external to memory 1210, it is to be understood that one or more of electrical components 1204, 1206, and 1208 may exist within memory 1210.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method performed by a mobile device for scanning channels in a communications environment, comprising:
   determining a time in service for a mobile device as a function of historical acquisition times and historical network depart times;
   developing a network log based on the time in service determination; and
   creating a channel ranking order based, in part, on the time in service determination, wherein the channel ranking order provides a sequence used by the mobile device for scanning channels in a communication environment.

2. The method of claim 1, further comprising:
   evaluating motion information associated with the mobile device; and
   utilizing the motion information to create the channel ranking order, wherein the motion information includes speed, direction, and altitude data.

3. The method of claim 1, further comprising:
   evaluating a context associated with the communication environment, the mobile device, or combinations thereof, and utilizing the context information to create the channel ranking order.

4. The method of claim 1, further comprises periodically scanning for availability of preferred networks during a network reselection attempt if a less preferred network is currently serving the mobile device.

5. The method of claim 1, wherein creating the channel ranking order comprises:
determining less preferred networks served the mobile device greater than a threshold percentage of time; and
attempting to acquire a less preferred network.

6. The method of claim 1, wherein creating the channel ranking order comprises:
determining less preferred networks did not serve the mobile device greater than a threshold percentage of time; and
attempting to acquire a preferred network.

7. The method of claim 1, wherein the network log includes information related to whether each network is a home network or a roaming network.

8. The method of claim 1, wherein historical network depart times include loss of network or leaving a network based on an instruction from the network.

9. The method of claim 1, further comprising:
determining a location of the mobile device; and
modifying the channel ranking order as a function of the location.

10. A wireless communications apparatus, comprising:
a memory that retains instructions related to calculating a time in service for each network acquired during a target time period, constructing a network log based on the time in service calculation, and creating a channel scan order that provides a sequence to scan channels in a communication environment, wherein the time in service is calculated as a function of historical acquisition times and historical network depart times; and
a processor, coupled to the memory, configured to execute the instructions retained in the memory.

11. The wireless communications apparatus of claim 10, the memory further retains instructions related to evaluating motion information associated with the mobile device and utilizing the motion information to create the channel scan order, wherein the motion information includes speed, direction, and altitude data.

12. The wireless communications apparatus of claim 10, the memory further retains instructions related to evaluating a context associated with the communication environment, the wireless communications apparatus, or combinations thereof and utilizing the context information to create the channel scan order.

13. The wireless communications apparatus of claim 10, the memory further retains instructions related to periodically scanning for availability of preferred networks during a network reselection attempt if a less preferred network is currently serving the wireless communications apparatus.

14. The wireless communications apparatus of claim 10, the memory further retains instructions related to determining less preferred networks served the wireless communications apparatus greater than a threshold percentage of time and attempting to acquire the less preferred network.

15. The wireless communications apparatus of claim 10, the memory further retains instructions related to determining less preferred networks did not serve the wireless communication apparatus greater than a threshold percentage of time and attempting to acquire a preferred network.

16. The wireless communications apparatus of claim 10, wherein the network log includes information related to whether each network is a home network or a roaming network.

17. A wireless communications apparatus that scans channels in a dynamically determined order, comprising:
means for analyzing a time in service for the wireless communications apparatus as a function of historical acquisition times and historical network depart times;
means for generating a network log based on the time in service determination, wherein the network log includes information related to whether each network is a home network or a roaming network; and
means for establishing a channel scan order based, in part, on the time in service determination, wherein the channel scan order provides an arrangement for scanning channels in a communication environment.

18. The wireless communications apparatus of claim 17, further comprises means for periodically scanning for availability of preferred networks during a network reselection attempt if a less preferred network is currently serving the wireless communications apparatus.

19. The wireless communications apparatus of claim 17, further comprising:
means for estimating that less preferred networks served the wireless communications apparatus greater than a threshold percentage of time; and
means for scanning less preferred networks more often than preferred networks.

20. The wireless communications apparatus of claim 17, further comprising:
means for estimating that less preferred networks did not serve the wireless communications apparatus greater than a threshold percentage of time; and
means for attempting to acquire a preferred network before attempting to acquire a less preferred network.

21. A computer program product, comprising:
a computer-readable medium comprising:
a first set of codes for causing a computer to calculate a time in service for a mobile device as a function of historical network acquisition times and historical network depart times;
a second set of codes for causing the computer to generate a network log based on the time in service determination; and
a third set of codes for causing the computer to establish a channel ranking order based, in part, on the time in service determination, wherein the channel ranking order provides a sequence for scanning channels in a communications environment.

22. At least one processor configured to scan network channels in a preferred order, comprising:
a first module for ascertaining a time in service for a mobile device as a function of historical network acquisition times and historical network depart times;
a second module for developing a network log based on the time in service determination;
a third module for generating a channel ranking order based, in part, on the time in service determination, wherein the channel ranking order provides a sequence for scanning channels in a communications environment; and
a fourth module for periodically scanning for availability of preferred networks during a network reselection attempt if a less preferred network is currently serving the mobile device.

* * * * *